(12) United States Patent
Morrow et al.

(10) Patent No.: US 7,375,309 B2
(45) Date of Patent: May 20, 2008

(54) METHOD AND APPARATUS USING MICROWAVE ENERGY TO HEAT A TARGET

(75) Inventors: M. Stan Morrow, Hixson, TN (US);
Gene E. Williams, Calhoun, GA (US);
Michael D. Williams, Calhoun, GA (US); Jacob H. Williams, Summerville, GA (US)

(73) Assignee: Ag-Way Technologies, LLC, Calhoun, GA (US)

( * ) Notice: Subject to any disclaimer, the term of this patent is extended or adjusted under 35 U.S.C. 154(b) by 215 days.

(21) Appl. No.: 11/320,114

(22) Filed: Dec. 28, 2005

(65) Prior Publication Data
US 2007/0145043 A1 Jun. 28, 2007

(51) Int. Cl.
*H05B 6/68* (2006.01)
*H05B 6/80* (2006.01)

(52) U.S. Cl. .................. 219/710; 219/725; 219/730; 219/759; 219/756; 99/325; 99/451

(58) Field of Classification Search ........ 219/725–735, 219/759, 762, 756–757, 746, 710–713; 99/DIG. 14, 99/451, 325
See application file for complete search history.

(56) References Cited

U.S. PATENT DOCUMENTS

| | | | | |
|---|---|---|---|---|
| 4,687,895 A | * | 8/1987 | Chitre et al. ............... | 219/701 |
| 4,803,324 A | * | 2/1989 | Fujii et al. .................. | 219/759 |
| 5,136,133 A | * | 8/1992 | Briggs et al. ............... | 219/756 |
| 5,378,875 A | * | 1/1995 | Hirama et al. .............. | 219/705 |

* cited by examiner

*Primary Examiner*—Philip H Leung
(74) *Attorney, Agent, or Firm*—Stephen J. Stark; Miller & Martin PLLC

(57) ABSTRACT

A microwave heating system utilizes a microwave energy generator to provide microwave energy through wave guides to targets. The targets are microwave absorbers and thereby increasing temperature upon the contact of microwave energy. The heated targets then transfer heat to an area to be heated such as by conduction, convection or radiation depending on the particular embodiment. A sensor in the area to be heated provides an input to a controller for controlling the input of microwave energy to be directed to the target.

20 Claims, 1 Drawing Sheet

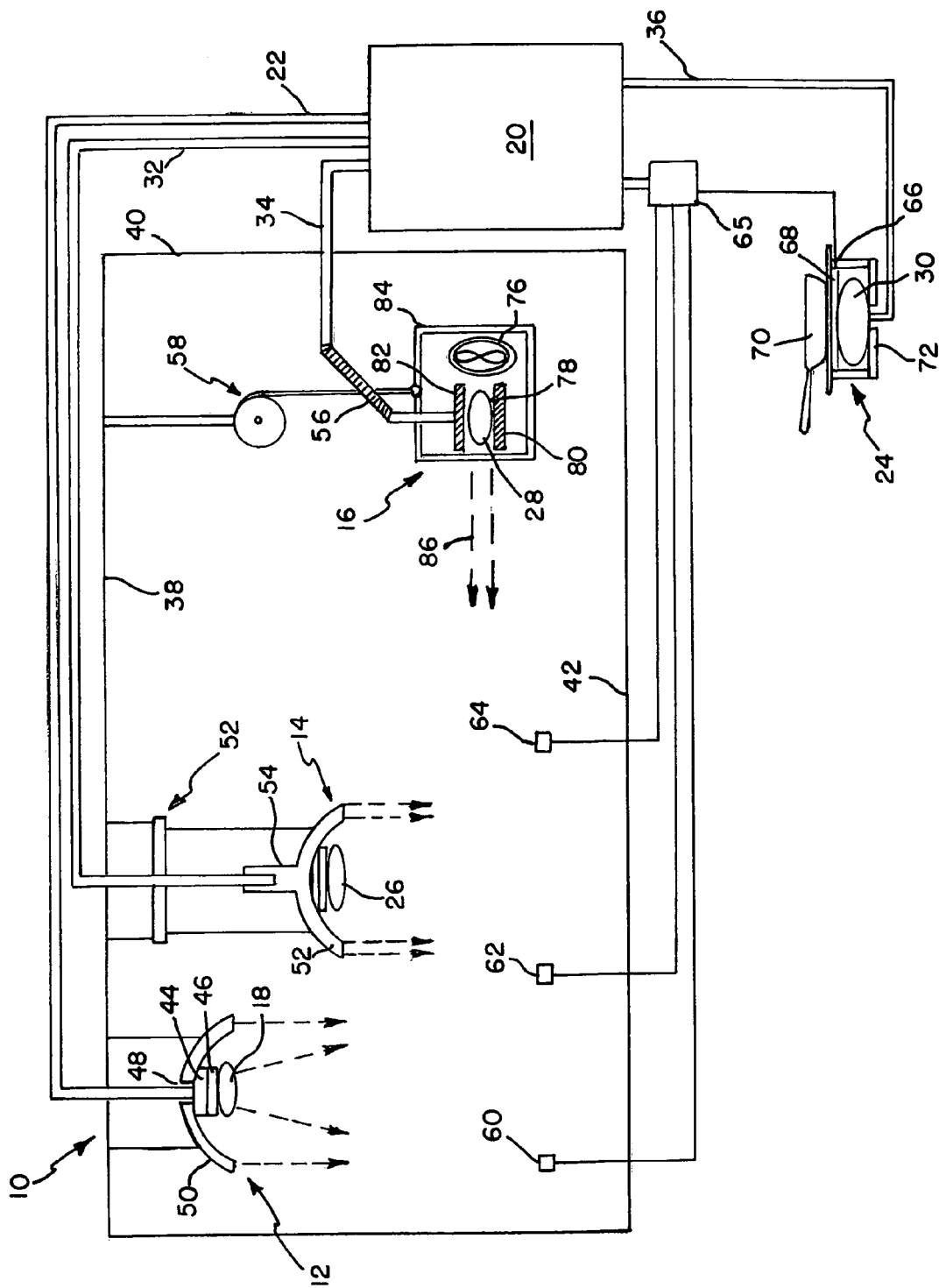

METHOD AND APPARATUS USING MICROWAVE ENERGY TO HEAT A TARGET

FIELD OF THE INVENTION

The present invention relates to a method and apparatus of using microwave energy for heating purposes, and more particularly to a method and apparatus using microwave energy to heat a microwave absorber such as a ceramic or other appropriate material formed as a target which absorbs the microwave energy and gives off heat which can include at least one of radiation, convection and/or conduction depending upon its particular application. In one preferred application the target is heated with microwave energy and then utilized to provide heat in a poultry house to replace heaters which traditionally rely on flames produced by burning petroleum sources such as propane, natural gas or other combustible energy sources.

BACKGROUND OF THE INVENTION

Presently, the applicant is aware that the poultry industry primarily relies on several different models of heaters that are normally fueled by propane or natural gas. These typically include conventional brooders, radiant brooders, infrared radiant brooders, forced air furnaces, tube heaters and other forms of propane-supplied heaters. These heaters normally combust propane utilizing a flame.

These models are presently somewhat expensive to operate because of relatively high fuel costs. Propane costs in 2005 in the southeast have increased approximately 21% over the cost at the same time in 2004. Under the current business model for operating poultry houses to raise chickens, this increased cost of heating can dramatically affect the profit of the poultry farmer since the revenue received by the poultry farmer has not increased a corresponding amount.

The flame based gas burner heaters also provide carbon monoxide and carbon dioxide emissions. These can have harmful effects on the poultry.

The flame driven heaters also result in a somewhat elevated insurance premium since there is a statistical risk of fire.

Many of the propane models provide a supply of propane to a heater from a flexible hose which is then ignited and directed onto a ceramic element. The ceramic element is heated by the flame and heat from the ceramic element is then normally radiated in part utilizing a concave reflector to reflect heat toward the ground. One problem with this common propane heater is that the heating of the ceramic elements is not normally uniform. A lack of uniformity in heating the ceramic elements can cause them to crack and break thereby necessitating replacement. Furthermore, a supply of propane is exhausted in elevating the temperature of the ceramic element to a desired temperature which does not directly correspond to additional heating of the area. Also, the flames can roll around the ceramic element. This can cause at least some of the heat to rise toward the ceiling without significantly heating up the desired ceramic target. Accordingly, such a design is not believed to be sufficiently efficient at converting the energy contained within the propane into heat.

In a modern tunnel ventilated poultry house with insulated walls and ceilings, four houses would provide 80,000 square feet which could support 120,000 3.75 lb. chickens. In northwest Georgia, one user has encountered a need to use 17,000 to 18,000 gallons of propane per year to support the necessary temperature curve recommended by the chicken processing companies.

Costs of propane this year for raising poultry has been found to be in the range of approximately $1.13$^9$ to $1.29$^9$ which equates to an average price per gallon of $1.19$^9$ per gallon. 17,000 gallons would equate to a little over $20,000.00 per year and 18,000 gallons would equate to about $21,500.00 per year. If the chicken houses were an older style which are not as well insulated as new houses, the costs of heating could be even higher. In fact, if the buildings are uninsulated, it is possible that the heating costs could be nearly double which would constitute a significant portion of the gross revenue received by the grower.

If a way to heat these houses could be provided at a cost savings to the grower, this is believed to be advantageous to the marketplace and the environment.

Furthermore, if a non-propane based heater or heating system for use with chicken houses, then the estimated current 200 billion gallons of propane used each year in the broiler industry would be reduced significantly, if not eliminated. This decrease in demand could enable the use of the petroleum products for other purposes which could also serve to drive the price of gas, diesel, fuel, propane and natural gases downward.

In addition to the reduced consumption of propane and/or natural gas, a decreased level of emissions that currently transpire from the poultry and agricultural housing facilities could be reduced. Carbon monoxide and carbon dioxide emissions which are provided as a product of inefficient and even efficient burning of propane could be virtually eliminated.

Additionally, the current consumption of propane in burners results in the production of wet heat. This water which is generated is absorbed in chicken litter which generates ammonia. Ammonia in chicken houses is an undesirable product as it can lead to a number of problems. Accordingly, a source of dryer heat would be particularly desirable.

At least the poultry industry has been searching for new or alternative methods of heating poultry houses for decades. Some have suggested heating poultry houses with used motor oils. Others have suggested the heating of poultry houses with burning litter. Both of these alternatives, although they consume less propane gas than the conventional heaters, rely on combustion which generates at least carbon dioxide if not carbon monoxide and other byproducts which may or may not be desirable to chickens and others.

Accordingly, a need is believed to exist for a more efficient heat source.

Another need is believed to exist for a non-petroleum based heater for use in at least an agricultural environment.

Yet another need is believed to exist for a non-flame dependent heater and/or heating system.

SUMMARY OF THE INVENTION

Accordingly, it is an object of the present invention to provide an improved heater.

It is another object of the present invention to provide a heater which utilizes microwave energy as an energy source that is capable of providing at least one of radiant, convective and conductive heat to a specified area.

Accordingly, a microwave power source generates microwave frequencies which are then preferably transmitted through wave guides to a target. The target then absorbs preferably at least 90% if not close to 100% of the microwaves received by the target and thereby converts the microwave energy into heat. The wave guide(s) may be equipped with a window which prevents dust and debris from accumulating within the wave guide while allowing the transmission of the microwaves to the target. Microwave transparent or permeable thermal insulation may also be utilized. As the target is elevated in temperature, energy then can be reflected by a shield such as by the transmission of radiant energy. It is also possible to blow air over the target to generate convection heating of a space. In still other embodiments it may be possible to conduct heat from the target to desired locations.

A temperature sensor is preferably located within a space such as a chicken house in the vicinity of the heater. The sensor provides a signal to a controller such as a computer controller such as a thermostat which provides a signal to the microwave power source or other controller which adjusts the timing and/or quantity of microwave energy provided to the target.

While the preferred embodiment is directed to the heating of enclosed agricultural spaces such as poultry houses, it will also be understood by one skilled in the art that similar technology could be adapted for use in heat pumps, for cook tops, or other heating applications.

BRIEF DESCRIPTION OF THE DRAWINGS

The particular features and advantages of the invention as well as other objects will become apparent from the following description taken in connection with the accompanying drawings in which:

The FIGURE shows a diagrammic representation of a presently preferred embodiment of the present invention utilized illustrating at least one heating system utilized to transfer heat to an area while monitoring the temperature and thus controlling an input of heat to the area.

DETAILED DESCRIPTION OF THE PREFERRED EMBODIMENT

The FIGURE shows various applications of the presently preferred embodiments of the present invention. Specifically, a climate controlled air space 10, or environment is illustrated having a plurality of controllable heaters 12,14,16 therein. The climate controlled environment 10 illustrated is the interior of a poultry house such as a modern chicken house but it could take the form of various other environments to be climate controlled such as industrial, commercial and/or even residential applications. In the preferred embodiment the environment 10 will be maintained at less than 120 degrees F., more preferably it will be maintained at less than 100 degrees F. and in many embodiments less than 98 degrees F.

Heater 12 is illustrated as a stationary heater which has a target 18 which receives microwave energy from a microwave power source 20. Other heaters can be moveable as will be discussed below. The microwave power source 20 can produce continuous, pulsing waves, or other series of microwave energy. The energy can then be directed through wave guide 22 or guides so that the microwave energy is directed to contract target 18. It is anticipated that the microwaves will be at least one specified frequency and that the wave guide 22 will be tuned to transport that microwave energy somewhat akin to a water hose transferring water from a source to a designated location. Common microwave energy frequency sources currently include 2.45 GHz, 915 MHz, 60 GHz, 35 MHz, 83 MHz. Other frequencies could also be utilized. It is understood to one skilled in the art that microwave energy could extend into the upper high frequency range or above (i.e., about 1 MHz to about 1,000 GHz). Wave guide technology is believed to be very good to transport microwave energy at high efficiencies.

Magnatrons and other microwave generators are commercially available. It is estimated that for use in four chicken houses comprising 80,000 square feet of heated floor space that a microwave generator 20 would be in the range of 500 watts to 1,000 kilowatts. The size may depend on the amount of area to be heated and in the efficiency of the particular apparatus that is utilized. It is anticipated that the microwave generator 20 will be located exterior to the climate environment to be controlled as represented by the climate controlled space 10.

By exterior, it is meant that the microwave power generator 20 be located external to the building of the heaters 12,14,16. In other applications such as the cook top 24, it is likely that the microwave generator 20 will be located as a portion of the appliance comprising the cook top 24 if used in such an embodiment. If the cook top 24 is sold as a unit with a range then the range could easily be convection heated range using a heater such as a heater configured as to the configuration of heater 16 as shown in the figure and discussed in further detail below.

The microwave energy is directed with wave guides 22 to target(s). It is important to remember that the wave guides can be directed to provide microwave energy to the target 18 for heater 12, the target 26 for heater 14, the target 28 for heater 16, and/or the target 30 for the cook top 24. Various other guides could be used for other heaters including those illustrated. The wave guides 22,32,34,36 can be constructed of copper, aluminum or other appropriate material. They may be of various lengths ranging from one inch or less to over 600 feet. One skilled in the art of wave guides will know how to provide the appropriate wave guides 22,32, 34,36 for a particular microwave frequencies. The wave guides 22,32,34 illustrated are shown entering the environment 10 through the roof 38 and wall 40. It will also be understood that wave guides could also pass through the floor 42 as well. As the wave guides 22,32,34,36 proceed to the respective heaters 12,14,16,24 they direct the microwave energy to the respective targets 18,26,28,30.

The targets 18,26,28,30 are microwave absorbers. Various ceramics have been found to be excellent absorbers such as some including silicone carbide. These materials absorb the microwave energy thereby producing heat. As the wave guides 22,32,34 provide the microwave energy to the targets 18,26,28 it is possible for the energy to be passed through microwave permeable, if not transparent, thermal insulation 44 and/or window 46. Window 46 has been found to be useful in that it provides a way to prevent debris from entering an opening 48 at the terminal end of the wave guide 22 to prevent dust or other debris from entering the wave guide 22 through the open end 48. The window 46 can be a coarse glass window or other microwave transparent type material. The microwave permeable or transparent thermal insulation 44 can be made of a number of known materials to one skilled in the art. The window 46 could also be insulative in nature.

A shield 50 is shown suspended from ceiling 38 for heater 12. It can either be in a fixed position as illustrated for heater 12 or elevationally adjustable. An elevation adjustment mechanism 52 is illustrated for heater 14. It is anticipated that a switch will allow for remote operation of the elevation of heater 14. Wave guide 32 has extension 54 which assists in elevation adjustment. Other adjustment mechanisms such as flexible wave guide 56 shown for heater 16 could also be employed or other mechanisms as are known in the art to allow wave guides to provide for the desired elevational adjustment to heaters 14,16 as the microwave energy is directed at the respective targets 26,28. A second elevational adjustment 58 is illustrated with heater 16 as a table and winch and other elevational adjustments as known in the art could also be utilized.

Heaters 12 and 14 are believed to be principally radiant type heaters in that the heat from the targets 18,26 are radiated to heat the areas to be heated. In these embodiments shown, the areas to be heated are located below the targets 18,26. Temperature sensors 60,62,64 are useful to provide an input to a controller 66 which may be one of a thermostat or a computer controller. Computer controllers are already common in chicken houses which allow for the programming of propane heaters. Similar technology is believed to be adaptable for use in controlling a microwave energy based system as shown and described herein. Specifically, the input from a temperature sensor 60,62,64 is received by the controller 66 which may be integral or separate from the generator 20 to provide the necessary microwave energy to be directed to at least the appropriate wave guide 22,32,34 for operation of the respective heater 12,14,16 to heat the desired area. Accordingly, a feedback loop is established.

While a controller in the form of a computer controller 66 could be utilized, thermostats located internal to the building 18 could be utilized to direct the microwave power generated to provide the desired signal to generate microwave energy to heat the targets 18,26,28.

In the embodiment of the cooktop, the sensor 66 such as the temperature of an eye illustrated as surface 68 which is heated by the target 30. The surface 68 is preferably in contact with the cooking instrument illustrated as a frying pan 70 to be heated. The sensor 66 can then provide a signal to the controller 66 for providing microwave energy through the wave guide 36. Reflectors 72 and/or insulation 74 may surround portions of the target 30 to assist in directing heat and/or providing a safe environment for the target relative to other components.

With the embodiment shown as a convection heater, namely, heater 16, a blower 76 is illustrated directing a stream of air along surfaces 78 of the target 28 and then directing this fluid stream to the area to be heated. Insulation 80 has been found useful and microwave permeable if not transparent insulation 82 is also useful to direct the microwave energy therethrough to contact the target 28.

The elevation adjustment mechanism 58 can be a cable and winch or other appropriate mechanism. A metal housing 84 houses the principal components of the heater 16. Other housings may be similarly or dissimilarly configures. It will be understood that other appropriate components could also be utilized as are known in the art.

Although a somewhat oval cross section is illustrated for the target 28, other configurations as are known in the art could be utilized to assist in the transfer of heat from the target 28 to the area to be heated such as the area represented within the environment 10 where the temperature sensor 64 is located.

Referring back to the radiant style heaters 12,14, shields 50,52 are useful in directing radiant heat. Shields are illustrated as being concave and are preferably constructed of metal. However, as understood to one skilled in the art other materials could also be utilized as with other configurations.

A number of advantages are believed to be experienced through the constructive use of the microwave energy as shown and described herein. Namely, since there is no flame, no carbon monoxide or carbon dioxide will be produced by a burning flame. Additionally, a dry heat rather than a wet heat as is often caused by the burning of propane will be produced. Therefore less ammonia will be produced when the heating systems are utilized in a poultry environment. Due to the relative efficiency of the microwave heat by directing the microwave energy onto a microwave absorber, the heaters illustrated are believed to be able to be constructed more efficiently than the existing propane heaters. Since the microwave generator 20 is anticipated to be principally electrically operated reduction of the consumption of propane and natural gas is anticipated.

Since no open flame is located within the poultry houses, it is anticipated that the insurance and insurance costs will be reduced over time and the relative safety will increase due to a decreased fire hazard. Furthermore, eliminating propane as a source of heat for poultry houses is believed to free up that fuel source for other sources thereby reducing its cost for various industries. Other benefits are believed to be available.

Although the shields 50,52 are illustrated as being circular and concave, they could also be oval shaped, rectangular shaped, square shaped or other appropriate shape. Additionally, it is possible that the targets 18,26,28, and 30 could be configured in various configurations to assist in directing heat to a desired location.

It is anticipated that the shields 50,52 would be a metal dome constructed of metal of $\frac{1}{16}$ of an inch to one inch and have a range of a two foot diameter circular shaped metal dome to a six feet by twenty foot rectangular metal dome. The height of the dome 50,52 may vary from one inch to approximately three feet depending on a particular construction.

Metals comprising the shields 50,52 could be galvanized metal, galvalume, steel, aluminum, ceramics or any other type of metal. Various coatings can be provided on the shields 50,52 such as those to protect from heat, ammonia or moisture. Additionally, various chemicals such as insecticides, disinfectants and litter amendments can be provided as coatings on the shields 50,52.

The materials selected for the targets 18,26,28,30 are preferably selected so that they heat rapidly and uniformly without breaking. The connection of the respective wave guides 22,32,34,36 to the respective targets 18,26,28,30 is preferably performed so that the microwave energy is at least substantially directly provided to the targets and uniformly to the targets. It is further estimated that there will not be any leakage past the targets of any microwave energy. Of course, a window 46 such as a coarse glass window is useful to prevent debris from entering within the open end 48 of the wave guides as illustrated.

The insulation 44 has been found useful to ensure that the targets 18 can be heated quickly and reduce heat loss making the heater apparatus more efficient. Although insulation 44 is shown in a specific location, other areas could be insulated as well. When not in the path of microwave energy, it would not necessarily be microwave energy permeable and/or transparent insulation. Although the shields 50,52 are shown to direct the heat on the ground, they could be directed in other directions depending on the particular application. Additionally, the heat can be anticipated to be transferred anywhere from 24 inches to 20 feet or more for heaters 12,14,16 or directly with cooktop heater 24.

Additionally, the heater 16 is shown inside the enclosures 10 although it could be located external and provide that the air flow 86 be directed into the climate 10.

By utilizing the technology shown and described herein, it is anticipated that a highly efficient heating source can replace propane and other natural gas sources in the poultry/agricultural housing environments including but not limited to the broiler industry, brooder industry, egg industry and turkey industry. The swine industry also uses petroleum based heaters which could be replaced with the technology described herein. Other applications such as the cook top application could also be derived from this technology. There are probably applications whether agricultural, industrial, commercial or residential which could also utilize the technology taught herein.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A heating system comprising:
    a microwave frequency generator generating microwave energy;
    a target, said target absorbing at least ninety percent of the microwave energy contacting the target from the generator and as a result of such absorption, elevating a temperature of the target;
    a temperature sensor located in an area to be thermally heated by the target, said area to be heated thermally by the target shielded from the microwave energy directed at the target;
    a controller in communication with the temperature sensor, said controller providing an output for use in controlling the microwave energy received by the target from the generator to at least assist in controlling a temperature of the area thermally heated by the target;
    wherein the target transfers heat to the area to be heated by the target as a result of a difference in temperature of the temperature of the target and the area to be heated.

2. The heating system of claim 1 further comprising a shield, said shield disposed opposite at least a portion of the target from the area to be heated, said shield reflecting at least some heat from the target to the area to be heated.

3. The heating system of claim 2 wherein at least a portion of the shield is concavely oriented relative to the target.

4. The heating system of claim 1 further comprising a wave guide, said wave guide directing the microwave energy intermediate the microwave generator and the target.

5. The heating system of claim 4 further comprising a wave guide window, said wave guide window contacting at least one of the wave guide and the target, said wave guide window allowing the passage of microwaves there through while preventing particulate from entering into at least a portion of the wave guide.

6. The heating system of claim 5 wherein the wave guide window contacts both the target and the wave guide and prevents particulate from entering the wave guide near the widow.

7. The heating system of claim 5 wherein the wave guide has an open end proximate to the target, said open end having the wave guide window disposed relative thereto thereby preventing particulate from passing the wave guide window further into the wave guide.

8. The heating system of claim 1 further comprising microwave transparent thermal insulation spaced from the target and intermediate at least a portion of the target and a flow of the microwave energy from the generator, said microwave energy passing at least substantially undiminished through the microwave permeable thermal insulation.

9. The heating system of claim 8 further comprising a shield, said shield disposed opposite at least a portion of the target from the area to be heated, said shield reflecting at least some heat from the target to the area to be heated, said microwave permeable thermal insulation contacting the shield.

10. The heating system of claim 1 wherein the target is comprised of a ceramic material.

11. The heating system of claim 10 wherein the ceramic material further comprises silicone carbide.

12. The heating system of claim 1 wherein the target absorbs at least ninety nine percent of the microwave energy contacting the target.

13. The heating system of claim 1 wherein the controller is at least one of a computer and a thermostat.

14. The heating system of claim 1 wherein heat is transferred from the target to the area to be heated by at least one of conduction through direct contact and conduction to an air space and radiation to an air space.

15. The heating system of claim 1 further comprising a blower, said blower causing a flow of air across the target to the area to be heated.

16. The heating system of claim 15 wherein at least one of the target and blower are elevationally adjustable.

17. The heating system of claim 1 wherein the area to be heated is a climate controlled space maintained at less than 110 degrees Fahrenheit with the heating system.

18. A heating system comprising:
    a microwave frequency generator generating microwave energy;
    a target, said target absorbing at least ninety percent of the microwave energy contacting the target from the generator and as a result of such absorption, elevating a temperature of the target;
    a temperature sensor located in an area to be thermally heated by the target, said area to be heated thermally by the target shielded from the microwave energy directed at the target, wherein the area to be heated is an eye of a cooktop, and the temperature sensor is in communication with the eye; and
    a controller in communication with the temperature sensor, said controller providing an output for use in controlling the microwave energy received by the target from the generator;
    wherein the target transfers heat to the area to be heated by the target as a result of a difference in temperature of the temperature of the target and the area to be heated.

19. A heating system in combination with a poultry house, comprising:
    a microwave frequency generator generating microwave energy;
    a target, said target absorbing at least ninety percent of the microwave energy contacting the target from the generator and as a result of such absorption, elevating a temperature of the target;
    a temperature sensor located in an area to be thermally heated by the target, said area to be heated thermally by the target shielded from the microwave energy directed at the target;

a controller in communication with the temperature sensor, said controller providing an output for use in controlling the microwave energy received by the target from the generator;

wherein the target transfers heat to the area to be heated by the target as a result of a difference in temperature of the temperature of the target and the area to be heated; and a poultry house having the target there inside and the generator located external thereto, and further comprising waveguides directing the microwave energy from the generator to the target.

20. The heating system of claim 19 further comprising a plurality of targets and waveguides.

* * * * *